United States Patent [19]
Boudot et al.

[11] Patent Number: 5,227,605
[45] Date of Patent: Jul. 13, 1993

[54] PROCESS FOR LASER WORKING IN A TUBE, AND WORKING HEAD FOR CARRYING OUT SUCH PROCESS

[75] Inventors: Cecile Boudot; Jacques Griffaton, both of Chalon S/Saone, France

[73] Assignee: Framatome, Courbevoie, France

[21] Appl. No.: 634,609

[22] Filed: Dec. 27, 1990

[30] Foreign Application Priority Data

Dec. 28, 1989 [FR] France .................. 89 17379

[51] Int. Cl.$^5$ .............................. B23K 26/00
[52] U.S. Cl. .................... 219/121.63; 219/121.64; 219/121.84
[58] Field of Search ............... 219/121.63, 121.64, 219/121.83, 121.82, 121.78, 121.84

[56] References Cited

U.S. PATENT DOCUMENTS 4,839,495 6/1989 Kitera et al. .................. 219/121.63

FOREIGN PATENT DOCUMENTS 0251846 1/1988 European Pat. Off. .
0300458 1/1989 European Pat. Off. .

Primary Examiner—C. L. Albritton
Attorney, Agent, or Firm—Pollock, Vande Sande & Priddy

[57] ABSTRACT

For laser welding in tubes of small diameter, protective gas is passed into the working zone by two currents originating from points situated on either side of this zone and converging towards it.

9 Claims, 1 Drawing Sheet

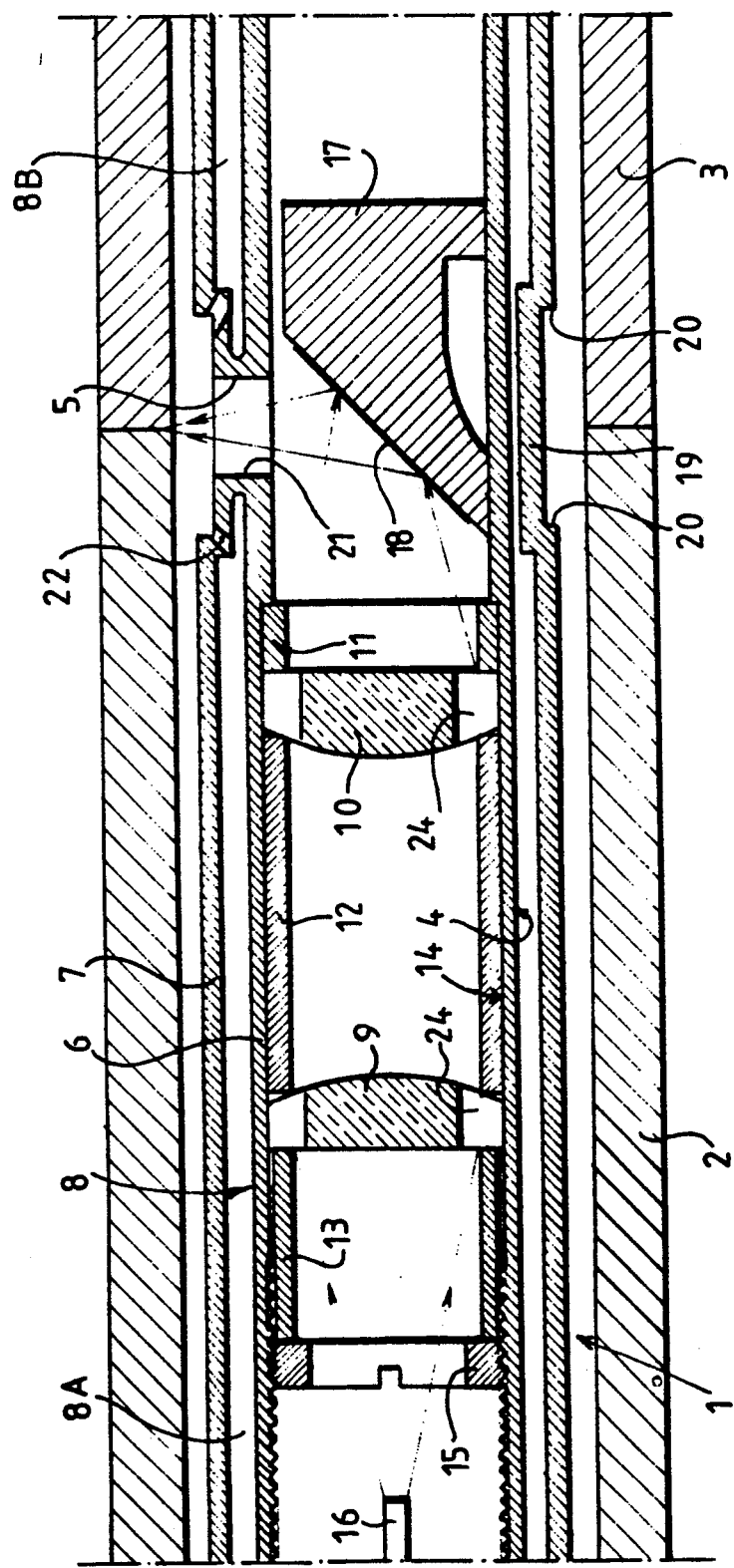

PROCESS FOR LASER WORKING IN A TUBE, AND WORKING HEAD FOR CARRYING OUT SUCH PROCESS

FIELD OF THE INVENTION

The present invention relates to laser working in a tube. It is applied, in particular, to laser welding in tubes of small diameter, such as the primary water tubes of the steam generators of pressurized-water nuclear reactors.

BACKGROUND OF THE INVENTION

It is conventional to pass a gas into the working zone, through the laser working head, for the purpose, in particular, of protecting the oxidation fusion bath. To this end, it is possible to cause the gas to emerge from the working head through the exit window of the laser beam, proceeding either from the space adjacent to the mirror for deflecting the laser beam, as described, for example, applicants' Patent Application FR 89/08,634, in the name of the applicant, or from an axial conduit which opens in a downstream direction into this window (EP-A-300,458).

SUMMARY OF THE INVENTION

The object of the invention is to increase the quality, the reliability and the reproducibility of the welds and to provide better protection for the working head against the heating caused by the fusion bath and against the splashes coming from this bath.

To this end, the subject of the invention is a process for laser working in a tube, of the type in which a gas is passed into the working zone through the working head, in which a gaseous screen is created in the region of the working zone, the thickness of which screen is greater than the interval which exists between the working head and the tube outside this zone.

Preferably, the gas is passed into the working zone by at least two currents originating from points situated on either side of this zone and converging towards it.

The subject of the invention is also a head for laser working in a tube which is particularly suitable for the implementation of the process. This working head, which is of the type comprising means for conveying a flow of gas into the working zone, has an is characterized in that external casing with an offset in the region of the exit window of the laser beam.

According to advantageous features:

the gas flow conveying means comprise at least two exit orifices situated on either side of the exit window of the laser beam and oriented towards the working zone;

the working head comprises a double casing which defines a continuous annular interval extending upstream and downstream of the window, the orifices communicating with this annular interval, and means for supplying gas to the annular interval;

the working head comprises means for conveying another flow of gas to the mirror for deflecting the laser beam and through the window.

BRIEF DESCRIPTION OF THE DRAWINGS

An embodiment of the invention will now be described with reference to the accompanying drawing, in which the single FIGURE represents in longitudinal cross-section a part of a laser working head in accordance with the invention.

DESCRIPTION OF PREFERRED EMBODIMENT

The laser working head represented in the drawing is intended to join two tubes 2 and 3 of small diameter end to end by welding. In a variant, the two tubes could be fitted into one another, or the task might involve fixing a repair sleeve into a tube by welding, in accordance with the technique conventionally used for the maintenance of the primary water tubes of the steam generators of pressurized-water nuclear reactors.

The general structure of the head 1 is conventional and may, for example, be that described in the above mentioned Patent Application FR 89/08,634 mentioned above. The drawing shows only the region of the head comprising the optical system 4 for focusing the laser beam and the exit window 5 of the focused laser beam.

In the region represented, the head 1 comprises a double casing consisting of an internal casing 6 and of an external casing 7 delimiting between them an annular space 8.

The optical system 4, disposed in the casing 6, comprises a set of lenses 9, 10 positioned by successive bracing rings 11, 12, 13. The latter are received in an internal facing 14 of the casing 6. The front brace 11 abuts onto the downstream end shoulder of this facing, and the stack of lenses and braces is retained by a ring 15 screwed to the upstream end of the same facing. The end of an optical fiber 16 conveying the laser beam is positioned on the axis of the head 1, upstream of the ring 15, by appropriate means (not shown).

The mirror 17 for deflecting the laser beam is disposed downstream of the assembly 9 to 13. It comprises face 18 at 45° causing the beam to emerge through the window 5 and focusing thereof onto the zone to be welded, at the junction of the two tubes 2 and 3.

The casing 7 comprises, level with the face 18, an annular offset 19 forming an annular throat delimited by two radial shoulders. The two casings 6 and 7 are connected to one another, in the median region of this throat, by a cylindrical collar 21 which constitutes the window 5 and the axis of which is radial in relation to the head 1 and is contained within the median plane of the offset 19. In relation to the window 5, the annular space 8 thus comprises an upstream part 8A and a downstream part 8B which communicate with one another. The part 8B is obturated in a downstream direction.

Two orifices 22 are pierced obliquely at the respective ends of the annular offset 19, symmetrically in relation to the collar 21 and in the same diametral plane as the latter. Thus, each orifice communicates with the annular space 8, with the parts 8A and 8B of the latter, respectively, and is directed substantially towards the point of incidence of the laser beam.

In service, a first flow of gas is passed into the interior of the working head as far as the mirror 17, via peripheral notches 24 formed in the lenses 9 and 10, and emerges from the head 1 towards the working zone through the window 5.

Furthermore, the upstream end 8A of spacing 8 is connected to a source of a second flow of gas, which fills the parts 8A and 8B of the spacing and emerges therefrom through the orifices 22 in the form of two inclined jets which converge symmetrically onto the working zone. The two flows of gas can, originate from a single source and consist of a neutral gas such as argon, helium or nitrogen, possibly containing a small proportion, for example of the order of 1%, of an active gas such as oxygen or hydrogen.

Thus, the working zone is copiously supplied with gas which forms a relatively thick screen between the head 1 and the working zone. In this manner, the gas not only protects the oxidation fusion bath, but also improves protection of the working head against heating caused by the metal in fusion and against splashes. This results in an increase in the service life of the tooling and an improvement of the quality, reliability and reproducibility of the welds.

We claim:

1. Process for laser working in a tube, of the type in which a gas is passed through a working head (1) into a working zone spaced from said tube, comprising the step of creating in the region of said working zone a gaseous screen having a thickness greater than a spacing between said working head (1) and said tube (2, 3) outside said working zone, said gas being passed into said working zone by at least two currents originating from points (22) located on either side of said working zone and converging towards said working zone.

2. Process according to claim 1, wherein said points (22) are respectively located upstream and downstream of said working zone.

3. Head for laser working in a tube, of a type comprising means for conveying a flow of gas into a working zone, said head comprising an external casing (7) having an offset (19) in a region of an exit window (5) for a laser beam.

4. Head for laser working according to claim 3, wherein said offset (19) is annular.

5. Working head according to claim 3, wherein said means for conveying a flow of gas comprise at least two exit orifices (22) located on either side of said exit window (5) and oriented towards said working zone.

6. Head for laser working according to claim 5, wherein said two orifices (22) are respectively located upstream and downstream of said exit window (5).

7. Head for laser working according to claim 5, comprising a double casing (6, 7) which defines a continuous annular spacing (8) extending upstream (8A) and downstream (8B) of said exit window (5), said orifices (22) communicating with said annular spacing, and means for supplying gas to said annular spacing.

8. Head for laser working according to claim 5, comprising means for conveying another flow of gas to said mirror (17) for deflecting said laser beam through said exit window (5).

9. Head for laser working according to claim 5, wherein said exit orifices (22) open into said offset (19).

* * * * *